Patented Sept. 14, 1926.

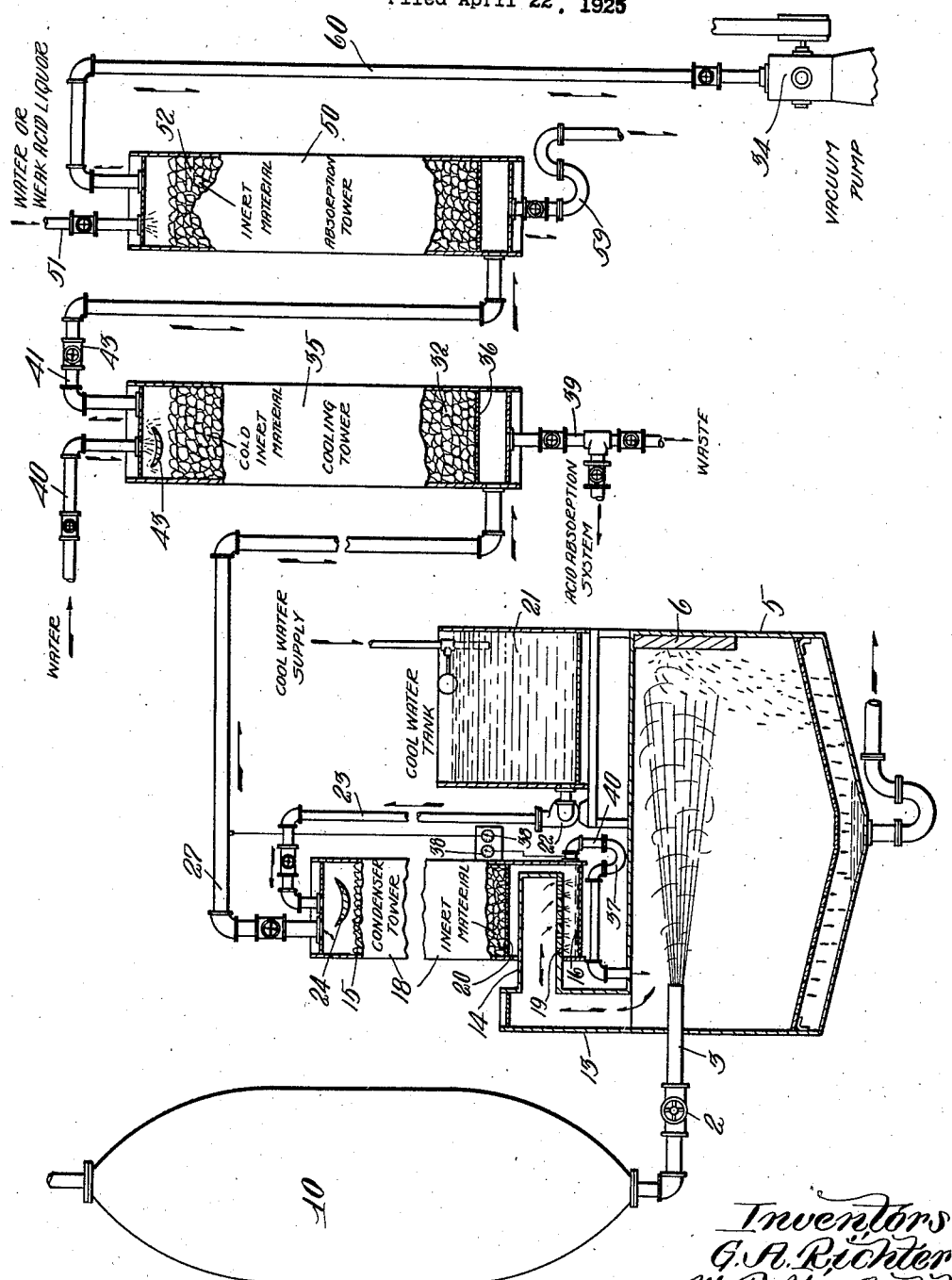

1,599,490

UNITED STATES PATENT OFFICE.

GEORGE A. RICHTER AND WALLACE B. VAN ARSDEL, OF BERLIN, NEW HAMPSHIRE, ASSIGNORS TO BROWN COMPANY, OF BERLIN, NEW HAMPSHIRE, A CORPORATION OF MAINE.

PROCESS FOR THE RECOVERY OF SULPHUR DIOXIDE FROM BLOW-PIT GASES.

Application filed April 22, 1925. Serial No. 24,969.

This invention relates to a process of cooling vapors and gases liberated in the blow pit during the blow of a sulphite digestor, and recovering sulphur dioxide therefrom.

In the process of recovery of sulphur dioxide from the steam and gases liberated in the blow pit during the blowing operation of a sulphite digester, the practice has been to cool the mixed gases by passing them in counter-current flow and in direct contact with cold water percolating slowly through a mass of surface material confined in a tower, in such manner that the major portion of the steam and vapor is condensed, the remaining gases being delivered in a relatively cool condition to an absorption system. (See U. S. Letters Patent to George A. Richter, No. 1,469,958, October 9, 1923.)

The economical operation of such a system must be carefully balanced between the volume of cooling water supplied to the cooling tower or condenser and the volume of vapors and gases liberated in the blow pit. If too large a quantity of cooling water is used in the tower, the effluent water will be relatively cool, and an excessive amount of dissolved sulphur dioxide will be carried away therewith; if too small a quantity of water is employed, it will not have entirely condensed out the steam or sufficiently diminished the heat content of the gases, and consequently they will emerge hot and moist from the tower, rendering inefficient the operation of the absorption system. The tendency in the sulphite mill is always to avoid the latter evil, so that it is usually the case that a large quantity of water is used, resulting in a cool effluent which carries away large quantities of dissolved sulphur dioxide which is lost, or which requires a separate means to recover the absorbed gas from the condensing water. Recovery of the sulphur dioxide from the effluent is feasible and may be resorted to, but it may not always be economical. Moreover, an indirect method of cooling the vapors and gases by a surface cooler or condenser of the tubular type is practically out of the question, because it would involve a large sized apparatus with large initial and maintenance cost.

The object of this invention is to provide an economical and efficient method of recovery of sulphur dioxide from the vapors and gases liberated in the blow pit during a blow of a sulphite digester. This object is attained by employing a small quantity of cooling water in the cooling tower or condenser, thereby abstracting as large a portion of the heat content of the gases and condensing as large a portion of the steam rising from the blow pit as is possible with substantially no sulphur dioxide loss due to absorption by the cooling water, and then passing the partially cooled gases and vapors through a second cooling tower or condenser filled with cold, inert, interstitial material, thereby further diminishing the heat content of the gases to a point where efficient operation of the absorption system results.

The accompanying drawing illustrates, more or less conventionally and diagrammatically, an apparatus by which the process may be carried out.

The contents of a digester 10 of any type suitable for the digestion of cellulosic material under heat and pressure with a sulphite liquor, as for example a calcium bisulphite liquor, are discharged into a blow pit 5 by a blow pipe 3 valved, as at 2, the digester contents being blown at the usual target 6 in the pit. Above the pit and communicating therewith through its top portion adjacent to the side opposite to the target side, is a conduit having a short vertical section 13 and a horizontal section 14, the latter section extending into the lower portion of a tower 18 and having apertures 19 through the bottom thereof communicating with the tower. The tower may be made of wood or other suitable inert material. As shown, it is located directly above the blow pit 5 and is filled with surface or interstitial material 15, such as spiral brick, inert rock or other inert mineral material, which is supported by a perforated horizontal partition 20 disposed a short distance above the top of the horizontal section 14 of the conduit. Cold water may be pumped from a supply source 21 through a pipe 23 by a pump 22 and distributed more or less uniformly over the top of the surface material 15 by a spray or distributor, as at 24. The water is thus distributed over and wets the large surface of the mineral material, percolating therethrough by many interrupted and tortuous passages, thereby coming into intimate contact for a relatively long period of time and over a large area of surface material with the hot vapor and gases from the blow pit which pass down through the apertures 19 into the bottom portion of the tower and rise into and upwardly within the tower.

The upwardly flowing gases are cooled by the downwardly percolating, relatively cold water, a large portion of the steam being condensed and removed therefrom, and are drawn out of the top of the condenser tower through a pipe 27. The water is heated on its downward passage through the tower by the hot gases and forms, together with the condensate from the steam which it carries therewith, a pond at the bottom 16 of the tower, with which the hot gases contact as they pass through the apertures 19, this acting to raise the temperature of the water in the pond and to liberate dissolved gases therefrom, and somewhat lower the temperature of the hot gases contacting therewith. A short distance above the bottom 16 of the tower and connected to its side, is a constant level pipe 40 with a trap 37 interposed therein, which pipe may, if desired, discharge into the pit. It maintains a fixed liquid level in the pond so that the water rising above the fixed level in the pond is continuously discharged by gravity. If this water is conducted to the blow pit, it is preferably discharged at a point so that it impinges against the hot digester contents as they are being blown in a stream against the target 6, thereby further raising the temperature of the water and tending to liberate any last traces of dissolved gases contained therein. The liquid contained in the trap 37 prevents any gases from the blow pit from entering into the tower through the pipe 40. Suitably connected to the gas pipe 27 and the constant level water pipe 40 are the recording thermometers 38, 38, so that the temperature of the water leaving the bottom of the tower and the temperature of the gases leaving the top of the tower may be ascertained at any time during the blow. The flow of water into the condenser tower may thus be suitably regulated so as to maintain the desired temperature of effluent water and cooled gases. Ordinarily, in the practice of our process, the effluent water from the condenser is at a temperature of approximately 200° F., and consequently at this temperature the solubility of $SO_2$ therein is so low that no appreciable proportion of $SO_2$ is carried by the water into the blow pit. Hence, if the effluent water is delivered to the blow pit, it serves to wash the pulp with a stream of hot water. The effluent may be discharged into a waste pipe external to the blow pit, and employed for any other suitable purpose. The partially cooled gases emerging from the top of the tower through the pipe 27 are passed to the bottom of a second cooling tower 35 of about the same size as the tower 18, which is also filled with cold, inert interstitial material 32 supported on a perforated partition 36.

The gases rise through the surface material filled tower, give up a further portion of their heat content to the cold inert material and are drawn out through the pipe 41, valved at 43. As the blow progresses, the cold material rises in temperature, the temperature of the gases emerging from the top of the tower also rising. During the time interval between blows, the interstitial material is cooled down to its initial temperature by water supplied from the pipe 40, which is suitably sprayed or distributed as by a distributor 43, uniformly on the top of the material, the cooling water being run to waste from the bottom of the tower by a waste pipe line 39 or conducted to some point in the plant where its acquired heat content may be advantageously utilized. In some instances, the condensate from pipe 39 may be conducted to some convenient point in the system by which raw acid liquor is produced.

The cooled gases emerging from the top of the tower 35 through a pipe 41, now contain a relatively small percent of water vapor together with larger percentages of sulphur dioxide and inert gases, and are passed into the bottom portion of the recovery or absorption tower 50 filled with crushed inert mineral material 52. Cold water may be run in at the top of the absorption tower at the proper rate through a pipe 51, slowly trickling down through the mass of material and absorbing the soluble sulphur dioxide, so that an acid liquor is discharged at the bottom of the tower 50 through a pipe 59; any unabsorbed or undissolved inert gas being withdrawn from the top of the tower 50 by a pipe 60 connected to a vacuum pump 34 which creates a partial vacuum in the entire system behind the blow pit and maintains the gas flow through the system. Preferably, however, there is introduced into tower 50 through pipe 51 what may be termed a cold, raw acid liquor, e. g., a calcium sulphite liquor, produced by causing sulphur burner gases and water to flow, counter to each other, through one or more towers containing a calcium-bearing material such as limestone or dolomite. Such a raw acid liquor may thus be further acidified by the strong $SO_2$ gas delivered from the blow pit, and the tail gas leaving pipe 60, which would contain about 15%–20% $SO_2$, would flow to the raw acid liquor absorption system.

A specific example of the foregoing process may be had from the following summary. After the cooking of wood chips in the digester 10 in a suitable sulphite liquor has been effected, the exhaust pump 34 is set in operation, and the valve 2 is opened, the contents of the digester 10 being blown in a stream through the pipe 3 against the usual target 6 in the blow pit 5. Water is run into the tower 18 at the required rate, so that the large quantities of steam and gas, which are liberated during the blow and which rise through the conduit sections 13 and 14 and pass down through the apertures 19 of the section 14, come into contact with the water pond 16 at the bottom of the tower. The gases, 90% by volume of which is steam and 10% permanent gases, principally nitrogen and sulphur dioxide, are at a temperature of about 210°–212° F. (depending on the barometric pressure), so that the water in the pond, which is at a lower temperature, partially cools the hot gases, any dissolved gases in the pond water being driven therefrom as this water is heated, and swept up with the steam and other gases. The gases then pass up through the material filled tower and come into contact with the multitudinous streams of water trickling counter-current thereto, a large proportion of the steam being condensed. The gases emerge from the top of the tower at about 180° F., the steam content thereof having been diminished to about 55%, by volume, of steam. The water is heated by the gases in its downward passage, and is discharged into the pond at the bottom of the tower, the water above the fixed level maintained by the pipe 20 being continuously discharged by gravity into the blow pit and impinging against the stream of digester contents, in the event that it be desired to wash the pulp in the pit by the hot water delivered from the condenser tower. Otherwise, the effluent liquor from the condenser may be conducted to a point external to the blow pit. The pond water is discharged at about 190° to 200° F., (preferably about 200° F.), and contains practically but little dissolved sulphur dioxide. If delivered to the blow pit, it is heated by the stream from the digester and if at a temperature at which it absorbs $SO_2$, the absorbed gas is liberated. The partially cooled gases from the first tower are passed to the bottom of the cooling tower 35 through the pipe 27. This tower is initially at a temperature of 60° to 70° F. (depending on seasonable temperature of the water) so that the first portion of the gas to pass therethrough will leave the tower and be cooled to within a few degrees of the initial temperature of the mineral material. As the blow progresses, the mineral material gradually heats so that the last portion of the gas may leave the tower 35 at about 110° to 120° F., the average temperature of the gas during an entire blow being in the neighborhood of 100° F. The gases emerging from the top of the tower 35 pass through the pipe 41 to the absorption tower 50, cold water or raw acid liquor being supplied thereto at the proper rate, the gas rising therethrough being absorbed by the water or acid liquor, and the effluent being discharged into the pipe 59. When the blow is completed, the pipe line 41 between the towers 35 and 50 is closed by the valve 43, and cold water is sprayed on the surface material contained in the tower 35 until it has assumed its initial low temperature of about 60°–70° F., the cooling water being run to waste through the pipe 39. The system is then ready for the next blow.

By practicing the process, substantially all of the sulphur dioxide from the blow pit is recovered. Substantially no gas is absorbed by the cooling water in the condenser tower, since the flow of the cooling water is so regulated as to effect its discharge from the condenser tower, at a temperature approximating 200° F. The second cooling of the gases and vapor is indirectly effected by the water employed in cooling the interstitial material in the second tower during the time interval between blows, but, since it does not come in direct contact with the gases, no precautionary measures are necessary for its regulation.

The cooled sulphur dioxide gas is finally recovered in whole or in part in the absorption tower, depending on the character of the liquid delivered thereto.

What we claim is:

1. A process for the recovery of sulphur dioxide from gases and steam liberated in the blow pit during the blowing operation of a sulphite charge, which comprises passing said gases and steam counter-current in direct contact with relatively cold water so as to condense only a portion of the steam and partially cool the gases, and further cooling said gases without absorption and condensing out another portion of the steam by passing them in contact with relatively cold inert interstitial material.

2. A process for the recovery of sulphur dioxide from gases and steam liberated in the blow pit during the blowing operation of a sulphite charge, which comprises passing said gases and steam in direct contact with relatively cold water trickling down a confined mass of surface material so as to condense only a portion of the steam and to partially cool the gas, and discharging the cooling water and condensate at a temperature at which sulphur dioxide gas is practically insoluble therein, and further cooling the gases and condensing out a further portion of the steam by passing the same through a mass of relatively cold interstitial material substantially free from extraneous water, and subsequently recovering the sulphur dioxide.

3. A process for the recovery of sulphur dioxide from gases and steam liberated in the blow pit during the successive blowing operations of a sulphite digester, which comprises passing said gases from each blow through relatively cold inert interstitial material without material absorption, and cooling said inert material substantially to its original temperature between successive blows.

4. A process for the recovery of sulphur dioxide from gases and vapor present in the blow pit during the blowing operation of a sulphite digester, which comprises passing said gases and vapor counter-current to water trickling down inert interstitial material, thereby condensing only a portion of the vapor and partially cooling the gases, and further cooling said partially cooled gases by passing them through a tower containing relatively cold inert interstitial material without material absorption, and then recovering the cooled sulphur dioxide by passing the same into contact with an absorbent liquid and a surface material.

5. That step in the process of recovery of sulphur dioxide from gases liberated in the blow pit during the blowing operation of a sulphite charge, which comprises partially cooling said gases by passing them through relatively cold interstitial material without absorption.

6. A process for the recovery of sulphur dioxide from gases liberated in the blow pit during the blowing operation of a sulphite digester, which comprises partially cooling said gases by passing them in direct contact with water trickling through a mass of interstitial material, and further cooling said gases by passing them through a second mass of cold inert interstitial material free from extraneous water.

7. A process for the recovery of sulphur dioxide from the steam and gases liberated in the blow pit during a blowing operation of a sulphite digester, which comprises blowing the digester contents in a stream into the blow pit, partially cooling the gases and condensing steam liberated in the pit by passing them counter-current to water trickling through a mass of interstitial material, recovering sulphur dioxide gas absorbed by said cooling water by discharging it so that it impinges upon the digester contents as they are being blown, and further cooling the partially cooled gases and condensing a further portion of the steam contained therein by passing through a second mass of cold inert surface material free from extraneous water.

8. A process for the recovery of sulphur dioxide from gases and vapor liberated in the blow pit during a sulphite blow, which comprises passing said gases in contact with a relatively cold liquid medium, thereby partially cooling the gases and condensing only a portion of the vapor contained therein, passing said partially cooled gases and vapor in direct contact with a relatively cold solid medium substantially free from extraneous water to further cool the same, and recovering the sulphur dioxide contained in said cooled gases.

In testimony whereof we have affixed our signatures.

GEORGE A. RICHTER.
WALLACE B. VAN ARSDEL.